United States Patent [19]

McGeoch et al.

[11] Patent Number: 4,633,251
[45] Date of Patent: Dec. 30, 1986

[54] METHOD AND APPARATUS FOR IDENTIFYING RADAR TARGETS

[76] Inventors: Ian L. M. McGeoch, Southerns, 37 Bayley Street, Castle Hedingham, Halstead, Essex C09 3DG; William B. Stawell, Taylers Farmhouse, Aldsworth, Cheltenham, Gloucestershire GL7 2PF, both of England

[21] Appl. No.: 532,730

[22] Filed: Sep. 15, 1983

[30] Foreign Application Priority Data

Sep. 18, 1982 [GB] United Kingdom ............... 8226640

[51] Int. Cl.$^4$ ............................................. G01S 13/80
[52] U.S. Cl. ....................................... 342/44; 342/195
[58] Field of Search ............... 343/6.5 LC, 6.5 SS, 343/6.5 R, 6.8 R, 6.8 LC; 364/517

[56] References Cited

U.S. PATENT DOCUMENTS

| | | | |
|---|---|---|---|
| 3,870,994 | 3/1975 | McCormick et al. | 343/6.5 R |
| 4,167,007 | 9/1979 | McGeoch et al. | 343/6.5 LC |
| 4,174,519 | 11/1979 | Poli | 343/6.5 R |

Primary Examiner—Thomas H. Tarcza
Assistant Examiner—Bernarr Earl Gregory
Attorney, Agent, or Firm—Bell, Seltzer, Park & Gibson

[57] ABSTRACT

The present invention relates to a method of and apparatus for identifying a selected radar target in which an initial interrogation radar pulse is transmitted from a base station and received at the selected target x and any other such radar targets y z at which it is applied to a respective responder causing the responder to generate a monitor response signal x1, x2, y1, y2, z1, z2 with a pulse separation tr not less than the duration of an identification signal. Each said target x, y, z receives one or more monitor response signals x1, . . . z2 from the other radar target responders. Any monitor response signals y1, y2, z1, z2 received partly overlapping the monitor response signal x1, x2 of any of said radar targets are detected and a garble flag means set thereat. The base station detects any garbling between monitor response signals received from the selected radar target and any other such radar target whereupon it transmits a suppression radar signal to suppress radar targets y, z having different, garble flag conditions from the selected radar target x until all the other radar targets have been suppressed y, z and then transmits at least two, identification signal portion seeking, interrogation radar signals and processes the identification signal portions received from the unsuppressed selected radar target so as to produce a signal containing all of the data concerning the specific individual identity of said selected radar target x.

10 Claims, 5 Drawing Figures

Responses at interrogator for responders x, y & z

Responder Block Diagram

METHOD AND APPARATUS FOR IDENTIFYING RADAR TARGETS

This invention relates to a method and apparatus for identifying radar targets whether fixed or mobile. The method and apparatus are especially useful for identifying ships at sea.

At present, ships at sea can only be identified by visual observation of the ship's name and port of registry which are painted on the hull, or by observation of flags or lamp signals indicating the four-letter Ietrenational Identification Code signal of the vessel. These means of identification are inadequate at night or in bad visibility. These is accordingly a need for an improved method of identifying ships at sea, and since many observations of ships are today effected by radar rather than visually, it is advantageous for such a method to employ a radar-triggered identification signal.

Radar identification systems have been known for many years, having originated during the Second World War in the IFF (Identity Friend or Foe) system. In auch systems, an interrogation apparatus sends out a pulse of radio waves (usually of about radar frequency), which is recognised by an indentification apparatus (known as a responder or transponder) fitted to a vehicle or other object within range of the interrogation apparatus. Upon receipt of the pulse, the responder sends back a reply signal, generally in the form of a train of pulses, which is decoded and displayed at the station containing the interrogation apparatus. Such systems, which require the provision of a responder on the vehicle or other object, are known as secondary radars, as distinct from primary radars which work by passive reflection of radio waves by targets. Normally a secondary radar is associated with a primary radar so that the responses received from responders on radar targets can be correlated with the echoes received by the primary radar from the targets themselves. Secondary radar systems are at present in use on some navigation buoys (the so-called RACONS) and in the Air Traffic Control Responder (ATCR) system. In the latter system, the pilot of an aircraft, upon request by Air Traffic Control, sets his responder to give a desired 16-bit response upon receipt of the appropriate radar signal; this 16-bit response is transmitted over a period of about 15 secs.

The ATCR system cannot, in practice, be adapted to marine use. An airline pilot is trained in the use of the system and is in continual contact with Air Traffic Control. The minimum separation between aircraft is 1 nautical mile (n.m.) and is usually considerably greater, so that the apparatus has only, at most, to distinguish between two target 1 n.m. apart. Air Traffic Control normally knows what aircraft should be within its airspace and can ask the pilots thereof to set their responders as Air Traffic Control desires. In addition, differences in height and the identification of aircraft.

In contrast, the crews of ships at sea are not trained in the use of secondary radar systems and are not in continual contact with shore radar stations. They may approach each other more closely than aircraft and a practical secondary radar system should be capable of distinguishing between two targets 0.5 n.m. apart on the same bearing. A shore station usually does not know what ships are likely to be in its vicinity at any one time, and due to reflections from waves the problem of radar clutter is more serious in systems intended for use with ships than in systems intended for aircraft.

Because ship's crews are not trained in the use of secondary radar systems, it is in practice essential that the responder of a maritime secondary radar system should be such that once set, it will function automatically for long periods without attention from the crew. Thus, each ship must carry a responder giving a unique signal. To provide the necessary number of different responses, the response must take the form of a pulse train containing a considerable number of different binary digits (bits); for east of reference, the response should indicate the four-letter International Identification Code signal of the vessel (which requires 24 bits) or, preferably, since not all nations'fleets use International Identification Codes, the seven-figure Lloyd's number (which requires 28 bits). However, the time between the receipt at the interrogator of the responses from two targets 0.5 n.m. apart on the same bearing is only about 6 $\mu$ secs. and to avoid garbling (the corruption of signals due to signals from two different targets arriving at the interrogator at the same time), it is essential that the two responses, as received at the interrogator, should not overlap. Accordingly, the duration of the signal produced by the responder should not exceed about 6 $\mu$secs. To transmit 24 or 28 bits within 6 $\mu$secs. and to receive and decode with an acceptable error rate at the interrogator, under reception conditions which may be far from favourable, would make such great demands upon the bandwidth, timing and transmission power of the responder as to make that responder too complex and expensive for the system to be practicable.

A particular problem that arises even with a system designed to accommodate the requisite information within one or more signals of acceptable duration is the corruption of responses from different responders when there are two or more, closely spaced responders so that their respective response signals arrive at the interrogator at the same time. This particular form of signal corruption or degradation is usually known as garbling. If there is used a system based on a pulsed RF source with coding in terms of pulse position i.e. separation between successive pulses then it would seem that at least 5 $\mu$s must be allowed between successive pulses so that code $\theta$ would be represented by a pulse separation of 5 $\mu$s (even without the magnetron maximum pulse rate limitation the minimum separation should be substantial to avoid confusion from multiple path transmission of the "start" pulse). If, as seems reasonable, four bits of code are transmitted each time then 16 time slots are required giving a total possible time of 20 $\mu$s using a 1 $\mu$s pulse. This means that garbling will occur if responders are separated by less than 3 Km (1.6 n.m), which may well be insufficient in real life.

According to the invention a method of identifying a selected radar target comprises:

transmitting from a base station an initial interrogation radar signal;

receiving the initial interrogation radar signal at the selected target and any other such radar targets;

applying said signal to a responder of each said target thereby causing the responder to generate a monitor response signal with a pulse separation not less than the duration of an identification signal;

receiving at each said target one or more monitor response signals from the responders of any other said radar targets;

detecting any monitor response signals received partly overlapping the monitor response signal of any of said radar targets and setting a garble flag means thereat;

detecting at said base station any garbling between monitor response signals received from the selected radar target and any other such radar target;

transmitting from said base station a suppression radar signal for suppressing either of radar targets having different, set or reset, garble flag means conditions which condition is different from the garble flag means condition of said selected radar target;

receiving said suppression radar signal at at least one said other such radar target and suppressing it;

repeating, if necessary, the suppression radar signal transmission until all said other such radar targets have been suppressed;

transmitting from a base station a first, identification signal seeking, interrogation radar signal;

receiving the first interrogation radar signal at the target, applying said signal to a responder, thereby causing the responder to generate a first identification signal containing a first portion of data concerning the specific individual identity of the target;

transmitting the first identification signal from the target;

receiving the first identification signal at the base station;

transmitting from the base station, in response to receipt of said first identification signal, at least a second, identification signal seeking, interrogation radar signal;

receiving the at least second interrogation radar signal at the target, applying said signal to the responder, thereby causing the responder to generate a first identification signal containing a first portion of data concerning the specific individual identity of the target;

transmitting the first identification signal from the target;

receiving the first identification signal at the base station;

transmitting from the base station, in response to receipt of said first identification signal, at least a second, identification signal seeking, interrogation radar signal;

receiving the at least second interrogation radar signal at the target, applying said signal to the responder, thereby causing the responder to generate at least a second identification signal containing additional data concerning the specific individual identity of the target;

transmitting the at least second identification signal from the target;

receiving the at least second identification signal at the base station; and processing the identification signals received by the base station so as to produce a signal containing all of the data concerning the specific individual identity of the target.

Thus with the system of the present invention garbling of identification responses from different targets under practical conditions is substantially avoided or reduced.

Further preferred features and advantages of the invention will appear from the following detailed description given by way of example and illustrated with reference to the accompanying drawings in which.

Figure 1:
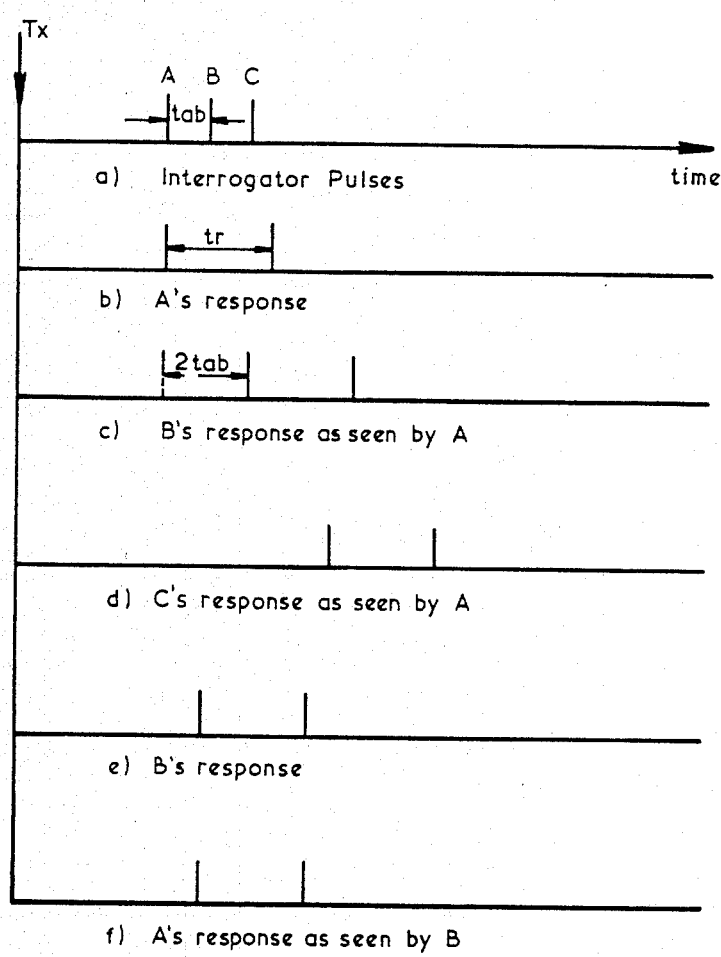
FIG. 1 is a schematic representation of some of the various interrogation and response signals transmitted in the case of a plurality of closely spaced radar targets using the method and apparatus of the present invention.

FIG. 1 (a) shows the timing of an interrogator pulse (Tx) being received at three responders A, B and C of three respective closely spaced radar targets Y, X, Z. FIG. 1 (b) shows A's response being two pulses separated by a time $t_r$. FIG. 1(c) shows B's response as seen by A which starts at a time $2t_{ab}$ after A's own response starts, where $t_{ab}$ is the time represented by the range separation between A and B. Garbling will occur at the interrogator if $2t_{ab}$ is less than $t_r$ and then as seen by A, B's start pulse will appear between A's response pulses. On the other hand no garbling will occur between A and C and C's start pulse will be seen by A after the end of A's own response (FIG. 1 (d)).

If the interrogator has sixteen time slots available to give sixteen codes then 8 will be required to demand 8 identification data nibbles of 4 bits each, leaving 8 codes as control codes. These could be as follows:

The first interrogation on a particular bearing would be a control code demanding a response with a pulse separation rather longer than 20 $\mu$s required for normal code transmission—this is the monitor response signal. In the interval between the monitor response signal all responders would listen out and if one received a pulse in the interval it would set an internal "garble flag", if not the garble flag would be reset. As during transmissions the receivers would be arranged to be blocked by a transmission switch TR, only A in FIG. 1 would set its garble flag as A's response at B and C would be coincident with their own transmissions (FIG. 1 (e) and (f)). The response of the TR switch of course determines the time by which the monitor response must exceed the normal identification signal response to guarantee that garbling would be detected.

Figure 2:
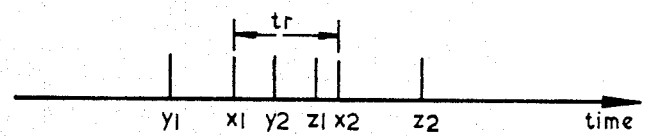
FIG. 2 is a similar representation of the response signals received at the interrogator.

At the interrogator garbling would be recognised by the pulse pattern received. For instance in FIG. 2 if x1 and x2 represent the monitor response pulses from the wanted responder x, and interfering response from a shorter range responder y would result in received pulses y1 before x1 and y2 after x1. Similarly interference from a more distant responder z would result in z1 before x2 and x2 after. In practice x1 and x2 would be identified by a range gate based, with suitable delay, on the primary radar range and by the known separation $t_r$ of the monitor response and y1 and z2 by further gates before and after the "wanted" gate for the selected target, each of the "early", "wanted", and "late" gates having a width slightly longer than the maximum identification signal length e.g. 25 $\mu$secs when a 20 $\mu$s maximum identification signal pulse separation is used.

After receiving the monitor responses the interrogator would "know" that it was in one of the following situations:

(a) No garbling.
(b) Garbling from a responder at a closer range than wanted.
(c) Garbling from a responder at a greater range.
(d) Garbling from both longer and greater ranges.

In case (a) the interrogator could go straight ahead with demands for identification code nibbles using the data codes.

In case (b) because y1, y2 result from a closer range responder this responder would have its garble flag set (cf A in FIG. 1). The interrogator could then send a system code for "respond only if garble flag not set". After checking on receipt of the next set of monitor pulses that the garbling had been eliminated, the interrogator could proceed with the dta code as in case (a).

In case (c) the wanted responder x producing x1, x2 would have its garble flag set by z. Thus a system code "respond only if garble flag set" would suppress z.

In case (d) both responders producing y1, y2 (unwanted) and x1, x2 (wanted) would have their garble flags set (y by x and x by z). This would need two system code cycles on successive transmissions. First the command "transmit only if garble flag is set" would suppress z and so reset x's garble flag. The interrogator could then proceed as in case (b).

Finally after the identificatioin had been received using the data codes, the interrogator would send a system code "reset" to reset all the responders to the intial condition, that is all primed to send a monitor response in reply to the initial system code.

Figure 3:
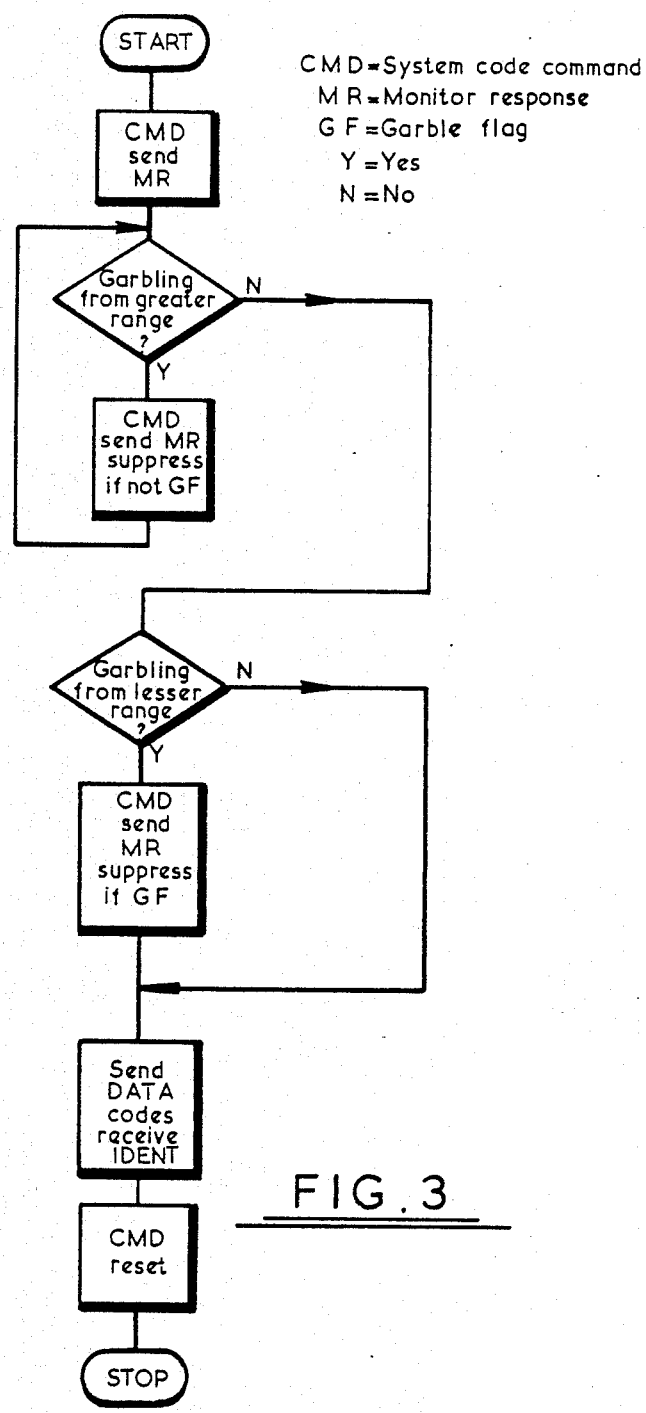
FIG. 3 is a flow diagram of the logic on which the method and apparatus of the invention is based.

A flow diagram of the interrogator logic is shown in FIG. 3. It will be appreciated that it may be necessary to repeat the process of suppressing the greater range interfering responders as, for example, z may have its garble flag set by a responder at an even greater range.

Figure 4:
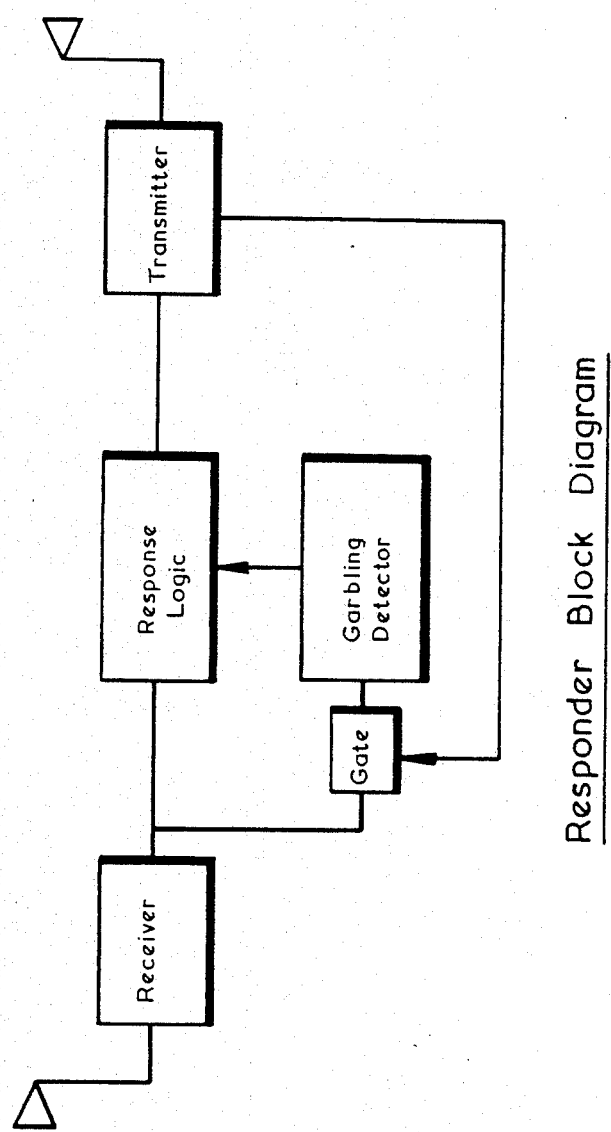
FIG. 4 is a schematic block circuit diagram of a responder of the present invention.
Figure 4:
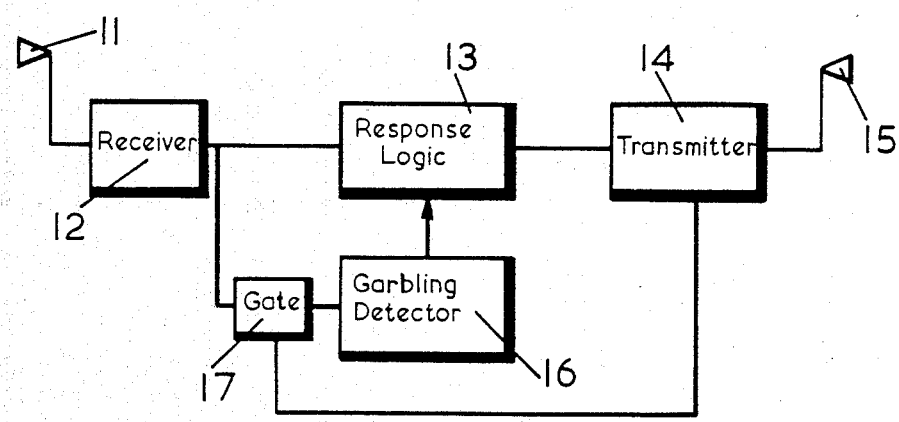

FIG. 4 is a block diagram of a suitable target responder having an interrogation signal receiving aerial 11 receiver 12, response logic means 13, and transmitter 14 with transmitter aerial 15 for transmitting monitor response and identification signals. A garbling detector 16 is connected downstream of the receiver 12 and to the transmitter 14 via a gate 17 for detecting monitor response signals received from other targets which are sufficiently close to produce garbling with the responder's own monitor response signal and is connected to the response logic means 13 for signalling such garbling thereto whereupon the response logic is arranged to set a 'garble flag'. The response logic 13 contains suppression means for suppressing the transmission of any response signals according to its garble flag condition and subsequent interrogation signals received as explained above.

Figure 5:
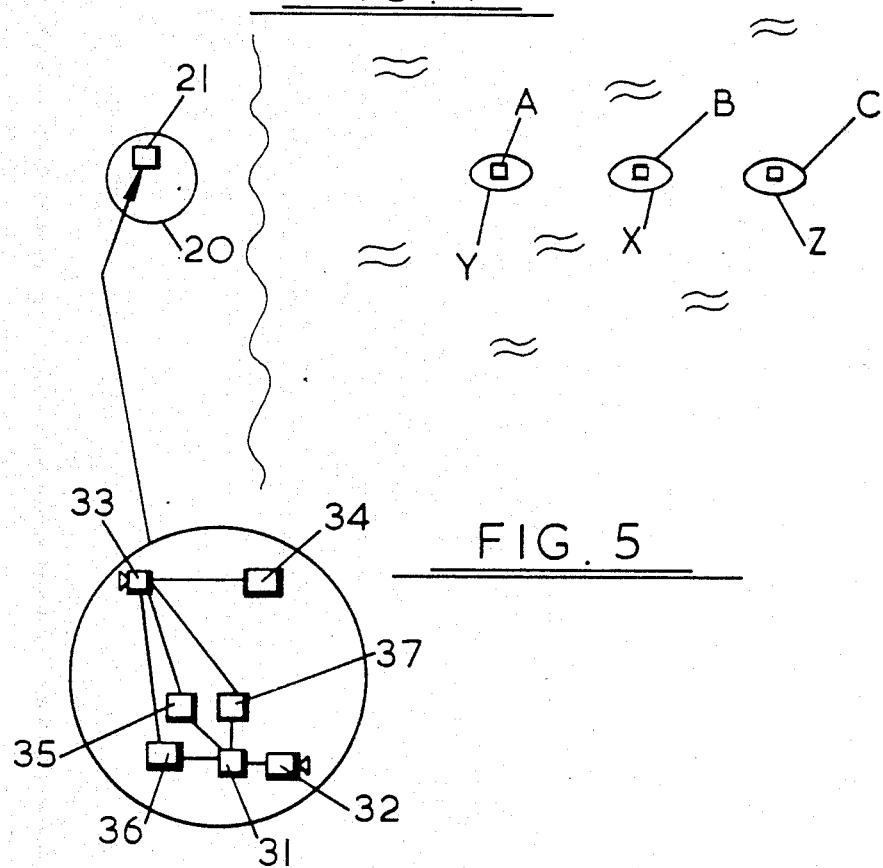
FIG. 5 is a general schematic view of the invention in use.

FIG. 5 shows schematically a coastguard station 20 with an interrogation apparatus 21 and three closely spaced target vessels x, y, z with respective responders B, A, C on a common bearing therefrom.

The interrogation apparatus 21 comprises a pulse generator 31 and transmitter 32 for generating and transmitting interrogation pulses, and receiver 33. Processing means 34 process the first and second (and any subsequent identification signals) to produce and eventually display an output corresponding to the full target identity. Also included are garble detecting means 35 for detecting garbling between monitor response signals received from different targets, suppression control means 36 for controlling the pulse generator to generate suppression signals for suppression of unwanted target responders, and identification interrogation control means 37 for controlling the pulse generator so that the second interrogation signal is only sent after receipt of the first identification signal.

With the above described arrangement it is possible to achieve reliable identification with quite narrow target separatins. Theoretically the limit is set by the pulse width plus the responder TR switch response time, something like 1½ cables.

The present invention also provides an apparatus for carrying out a method for identifying a selected radar target according to the invention, in which the interrogation apparatus comprises:

a pulse generator means for generating in turn one or more initial interrogation signals, one or more suppression signals, a first, identification signal seeking, interrogation signal or a second, identification signal seeking, interrogation signal;

transmitting means capable of transmitting either of said signals;

receiving means capable of receiving in turn monitor response signals from a plurality of targets and first and second identification signals from the selected target, each of which identification signals contains data concerning a different part of the identity of the target; and processing means which, upon receipt of the first and second identification signals, will generate a third signal containing all the data concerning the target contained in both identification signals, said third signal corresponding to the full identity of the target;

said interrogation apparatus also including:

garble detecting means for detecting any garbling between monitor response signals received from the selected target and any other target;

suppression control means arranged for controlling the pulse generator means so as to generate said suppression signals for suppression of radar targets having garble indication means in a different condition from that of the selected target; and an identification interrogation control means arranged for controlling the pulse generator means and-/or transmitting means so that said second interrogation signal is transmitted only upon receipt by the receiving means of said first identification signal.

Very desirably, the interrogation apparatus of the invention includes one or more range gates and/or a bearing gate, the gates being interposed between the receiving means and the processing means, the range gates being such that they will only allow to pass therethrough signals received by the receiving means during a respective predetermined interval after one of the interrogation signals has been transmitted by the transmitting means, and the bearing gate beig such that it will only allow to pass therethrough signals received by the receiving means between two predetermined bearings.

Finally, the invention provides apparatus of the invention in which the identification apparatus (or "responder") comprises:

receiving means for receiving an initial interrogation signal, a suppression signal, and a first and a second interogation signal, the second interrogation signal being different from the first signal;

a signal discriminator connected to the receiving means for discriminating between the first and second interrogation signals;

a signal generator connected to the signal discriminator for generating a monitor response signal and a first and a second identification signal which contain different data, the signal generator being arranged so that when the signal discriminator ndicates the receipt of a first interrogation signal by the receiving emans, the signal geneator will generate the first identification signal, whilst when the signal discriminator indicates the receipt of a second interrogation signal by the receiving means the signal generator will generate the second identification signal;

transmitting emans for transmitting the monitor response and first and second identification signals generated by the signal generator;

a garble detection means for detecting any monitor response signal received from other targets which monitor response signal partly overlaps the monitor response signal of said responder and setting a gable flag means in response to detection of such monitor response signal; and a suppression signal detector for detecting a said suppression signal formed for reception at responders having the same garble flag condition as said responder and suppressing the signal generator and/or transmitting means in response to reception of a said suppression signal whereby transmission of monitor response and identification signals by responders of targets other than a selected target may be suppressed.

To reduce the error rate in the method of the invention the complete identification signal preferably contains a plurality of check bits and the interrogation apparatus incorporates a means (such as a microprocessor) to reject any complete identification signal that does not contain consistent check bits.

Conveniently the identification signals differ from the respective interrogation signals.

To correllate the identification signals from the responder with the blip representing the target on the search radar, the latter is desirably provided with apparatus by means of which the operator can strobe the target he wishes to identify using the search radar's range strobe and bearing cursor and then request the interrogation radar to display the deocded response from the strobed target. At the simplest this display could then be written onto the search radar display using a suitable erasable writing medium, for example, a chinagraph pencil. (Whilst it would be possible to incorporate into the apparatus circuits which would cause the decoded response to be displayed alongside the blip representing the target and to follow the blip across the screen, in practice such sophistication is unecessary having regard to the relatively slow movement of ships across a marine radar screen). In cases where the primary radar is part of a computer controlled surveilance system as, in for instance, a Vessel Traffic Management System, the interrogator would be arranged to accept range and bearing information from the controlling computer and transmit identification codes to it.

Further details of suitable apparatus for generating and processing identification signals and suitable parameters therefor are disclosed in our published U.S. Pat. No. 4,167,007 issued to Ian L. M. McGeoch et al on Sept. 4, 1979.

What is claimed is:

1. A method of identifying a selected radar target from a plurality of other such targets which method comprises:

transmitting from a base station an initial interrogation radar signal;

receiving the initial interrogation radar signal at the selected radar target and said other such radar targets;

applying said signal to a responder of each said radar target thereby causing the responder to generate a monitor response signal with a pulse separation not less than the duration of an identification signal;

receiving at each said radar target one or more monitor response signals from the responders of any other said radar targets;

detecting at each said radar target any monitor response signals received partly overlapping the monitor response signal of any of said radar targets and setting a garble flag means thereat;

detecting at said base station any garbling between monitor response signals received from the selected radar target and any other such radar target;

transmitting from said base station a suppression radar signal for suppressing any radar target having garble flag means conditions different from the garble flag means condition of said selected radar target;

receiving said suppression radar signal at at least one said other such radar target and suppressing such radar target;

repeating, if necessary, the suppression radar signal transmission until all said other such radar targets have been suppressed;

transmitting from the base station a first, identification signal seeking, interrogation radar signal;

receiving the first interrogation radar signal at the target, applying said interrogation radar signal to the responder thereof, thereby causing the responder to generate a first identification signal containing a first portion of data concerning the specific individual identity of the target;

transmitting the first identification signal from the target;

receiving the first identification signal at the base station;

transmitting from the base station, in response to receipt of said first identification signal, at least a second, identification signal seeking, interrogation radar signal;

receiving the at least second interrogation radar signal at the target, applying said second interrogation radar signal to the responder, thereby causing the responder to generate at least a second identification signal containing additional data concerning the specific individual identity of the target;

transmitting the at least second identification signal from the target;

receiving the at least second identification signal at the base station; and processing the identification signals received by the base station so as to produce a signal containing all of the data concerning the specific individual identity of the target.

2. The method of claim 1, in which the complete identification signal contains a plurality of check bits and in which the interrogation apparatus incorporates a gate means which will reject any incoming signal which does not contain the appropriate check bits.

3. The method of claim 1 in which the second identification signal seeking, interrogation signal differs from the first identification signal seeking, interrogation signal.

4. The method of claim 1 in which the base station is provided with manually-presettable range and bearing controls and with range and bearing gate means which will only allow to pass therethrough responses emanating from targets having ranges and bearings within limits specified by the setting of the range and bearing controls.

5. The method of claim 1, in which the base station transmits each interrogation signal at invervals until a corresponding identification signal is received and thereafter transmits the subsequent interrogation signal.

6. The method of claim 5, in which the target is a ship and the base station will, after transmission of a plurality of interrogation radar signals and reception of a plurality of corresponding identification signals, produce a signal indicating either the four-letter International Identification Code signal or the Lloyd's number of the ship.

7. An improvement in an apparatus for identifying a selected radar target from a plurality of other such radar targets, said apparatus comprising interrogation means including:
    pulse generator means for generating at least one initial interrogation signal, at least one suppression signal, and at least a first and a second identification signal seeking interrogation signals;
    transmitting means capable of transmitting either of said signals;
    receiving means capable of receiving in turn monitor response signals from a plurality of radar targets and first and second identification signals from said selected radar target, each of which identification signals contains data concerning a different part of the identity of said selected radar target; and
    processing means which, upon receipt of said first and second identification signals, will generate a third signal identifying said selected radar target,
    the improvement comprising said interrogation apparatus having:
    garble detecting means for detecting any garbling between monitor response signals received from said selected radar target and any other such radar target;
    suppression control means arranged for controlling said pulse generator means to generate said suppression signals for suppression of radar targets having garble indication means in a different condition from that of said selected radar target; and
    an identification interrogation control means arranged for controlling said transmitting means so that said second interrogation signal is transmitted only upon receipt by the receiving means of said first identification signal.

8. The apparatus of claim 7, in which the interrogation apparatus includes a gate means interposed beween the processing means and output means, said gate means only allowing to pass therethrough a complete identification signal which contains predetermined check bits.

9. The appartus of claim 7 in which the interrogation apparatus includes range and bearing gate means interposed between said receiving means and said processing means, said range gate means being such that it will only allow to pass therethrough signals received by the receiving means during a predetermined interval after one of the interrogation signals has been transmitted by the transmitting means and said bearing gate means being such that it will only allow to pass therethrough signals received by the receiving means between two predetermined bearings.

10. Responder apparatus for producing radar target identification signals in response to interrogating signals comprising:
    receiving means for receiving an initial interrogation signal, a responder suppression signal, and a first and a second interrogation signal;
    a signal discriminator connected to said receiving means for discriminating between said first and second interrogation signals;
    a signal generator connected to the signal discriminator for generating a monitor response signal and a first and a second identification signal, which contain different data, the signal generator being arranged so that when the signal discriminator indicates the receipt of a first interrogation signal by the receiving means, the signal generator will generate the first identification signal, and when the signal discriminator indicates the receipt of a second interrogation signal by the receiving means the signal generator will generate the second identification signal;
    transmitting means for transmitting the monitor response and first and second identification signals generated by the signal generator;
    a garble detection means for detecting any monitor response signal received from other radar targets which monitor response signal partly overlaps the monitor response signal of said responder and setting a garble flag means in response to detection of such monitor response signal; and
    a suppression signal detector for detecting a suppression signal formed for receiption at responders having teh same garble flag condition as said responder and suppressing said transmitting means in response to receiption of said suppression signal whereby transmission of monitor response and identification signals by responders of targets other than a selected target may be suppressed.

* * * * *